United States Patent
Corr et al.

(10) Patent No.: US 7,001,511 B2
(45) Date of Patent: Feb. 21, 2006

(54) APPARATUS AND METHOD FOR REMOVING SOLVENT RESIDUES

(75) Inventors: Stuart Corr, Warrington (GB); Paul A. Dowdle, St Helens (GB); Robert E. Low, Northwich (GB); James David Morrison, Northwich (GB); Frederick Thomas Murphy, Frodsham (GB)

(73) Assignee: Ineous Fluor Holdings Limited, (GB)

( * ) Notice: Subject to any disclaimer, the term of this patent is extended or adjusted under 35 U.S.C. 154(b) by 180 days.

(21) Appl. No.: 10/623,308

(22) Filed: Jul. 18, 2003

(65) Prior Publication Data

US 2004/0016704 A1 Jan. 29, 2004

Related U.S. Application Data

(62) Division of application No. 09/654,805, filed on Sep. 5, 2000, now Pat. No. 6,685,839.

(30) Foreign Application Priority Data

Sep. 6, 1999 (GB) ................................. 9920949

(51) Int. Cl.
   *C02F 1/00* (2006.01)
(52) U.S. Cl. .................................... 210/177
(58) Field of Classification Search ................. 210/177
   See application file for complete search history.

(56) References Cited

U.S. PATENT DOCUMENTS

| | | |
|---|---|---|
| 1,977,411 A | 10/1934 | Smith |
| 3,612,066 A | 10/1971 | Jones et al. |
| 3,669,679 A | 6/1972 | Panzer et al. |
| 3,671,263 A | 6/1972 | Patel et al. |
| 4,100,016 A | 7/1978 | Diebold et al. |
| 4,289,505 A | 9/1981 | Hardison et al. |
| 4,331,695 A | 5/1982 | Zosel |
| 4,368,152 A | 1/1983 | Oughton |
| 4,486,453 A | 12/1984 | Morrison, Jr. et al. |
| 4,539,816 A | 9/1985 | Fox |
| 4,802,975 A | 2/1989 | Mehlberg |
| 5,092,983 A | 3/1992 | Eppig et al. |
| 5,281,732 A | 1/1994 | Franke |
| 5,516,923 A | 5/1996 | Hebert et al. |
| 5,819,556 A | 10/1998 | Higginbotham et al. |

FOREIGN PATENT DOCUMENTS

| | | |
|---|---|---|
| CH | 289059 | 2/1953 |
| DE | 3045877 A1 | 7/1982 |
| DE | 3538745 A1 | 5/1987 |
| GB | 0021141.7 | 9/2000 |
| WO | WO 94/20486 | 9/1994 |
| WO | PCT/GB 00/03319 | 8/2000 |

*Primary Examiner*—Chester T. Barry
(74) *Attorney, Agent, or Firm*—Cook, Alex, McFarron, Manzo, Cummings & Mehler, Ltd.

(57) ABSTRACT

In the field of biomass extraction, there is a need for effective removal of solvent from spent biomass material. An apparatus for removing solvent residues includes a vessel (11) for containing biomass; a steam source (19) for supplying steam to contact the biomass; and a separator (24) for separating solvent from steam that has contacted the biomass. The disclosure also includes a method of use of the apparatus.

12 Claims, 1 Drawing Sheet

APPARATUS AND METHOD FOR REMOVING SOLVENT RESIDUES

Figure 1:
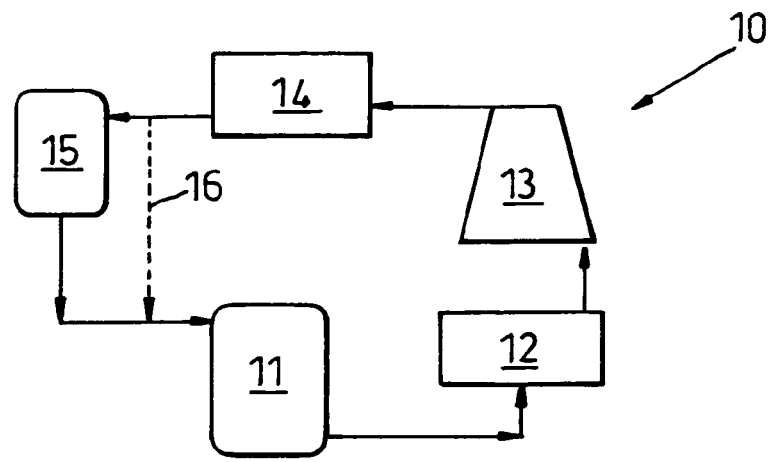

This application is a division of application Ser. No. 09/654,805, filed Sep. 5, 2000 now U.S. Pat. No. 6,685,839.

This invention concerns apparatuses and a method for removing solvent residues in particular after "extraction" of biomass. Biomass extraction is the extraction of flavours, fragrances or pharmaceutically active ingredients from materials of natural origin (these materials being referred to as "biomass".

Examples of biomass materials include but are not limited to flavoursome or aromatic substances such as coriander, cloves, star anise, coffee, orange juice, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable e.g. from plant material, a cell culture or a fermentation broth.

There is growing technical and commercial interest in using near-critical solvents in such extraction processes. Examples of such solvents include liquefied carbon dioxide or, of particular interest, a family of solvents based on organic hydrofluorocarbon ("HFC") species.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ hydrofluoroalkanes. Suitable examples of $C_{1-4}$ hydrofluoroalkanes which may be used as solvents include, inter alia, trifluoromethane (R-23), fluoromethane (R-41), difluoromethane (R-32), pentafluoroethane (R-125), 1,1,1-trifluoroethane (R-143a), 1,1,2,2-tetafluoroethane (R-134), 1,1,1,2-tetrafluoroethane (R-134a), 1,1-difluoroethane (R-152a), heptafluoropropanes and particularly 1,1,1,2,3,3,3-heptafluoropropane (R-227ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea) and 1,1,1,3,3-pentafluorobutane (R-365mfc). Mixtures of two or more hydrofluorocarbons may be used if desired.

R-134a, R-227ea, R-32, R-125, R-245ca and R-245fa are preferred.

An especially preferred hydrofluorocarbon for use in the present invention is 1,1,1,2-tetrafluoroethane (R-134a).

It is possible to carry out biomass extraction using other solvents such as chlorofluorocarbons ("CFC's") and hydrochlorofluorocarbons ("HCFC's"), and/or mixtures of solvents. CFC's and HCFC's are not approved for food use and consequently are rarely employed in extraction processes in which the depleted biomass residue is intended as e.g. an animal feed.

Known extraction processes using solvents are normally carried out in closed-loop extraction equipment. A typical example 10 of such a system is shown schematically in FIG. 1.

In this typical system, liquefied solvent is allowed to percolate by gravity in downflow through a bed of biomass held in vessel 11. Thence it flows to evaporator 12 where the volatile solvent is vaporised by heat exchange with a hot fluid. The vapour from vaporator 12 is then compr ssed by compressor 13.

The compressed vapour is next fed to a condenser 14 where it is liquefied by heat exchange with a cold fluid. The liquefied solvent is then optionally collected in intermediate storage vessel 15 or returned (line 16) directly to the extraction vessel 1 to complete the circuit.

One of the key areas of concern relating to the use of solvents such as are used in biomass extraction processes is the level of residual solvent on the biomass material after extraction is complete. High levels of residual HFC (or other) solvent may be regarded as undesirable from a number of aspects:

loss of HFC to atmosphere
  loss of HFC from the recycle process potentially increasing top-up costs
  landfill, incineration, composting and other biomass disposal regulatory issues
  suitability of depleted biomass for use as an animal feedstuff supplement In order to improve the rate of solvent extraction, the biomass is usually chopped or ground in some manner in order to increase the surface area in contact with the extraction solvent. Whilst beneficially increasing the rate of extraction of the desired components during biomass extraction, this increased surface area acts to increase the quantity of solvent that can remain adsorbed onto and in the biomass after extraction. Clearly some cost-effective method of achieving acceptable residual HFC solvent levels in the exhausted biomass would be of significant value in the development of the technology.

A combination of evacuation and heat (e.g. using a heating jacket surrounding extraction vessel 11) may act to reduce the levels of residual solvent in the biomass over a period of time. This method however has a number of potential disadvantages including:

prolonged evacuation time to achieve low residue levels
  poor heat transfer into the packed-bed of biomass from the vessel jacket resulting in uneven heating and possible thermal deterioration of the biomass (charring, caramelisation etc.)

Such charring and caramelisation are particularly undesirable since they may adversely impact the commercial value of the biomass extracts.

According to the invention in a first aspect there is provided apparatus for removing solvent residue from a bed of biomass comprising an extraction vessel for containing biomass that permits a solvent or a solvent mixture to contact biomass therein to effect extraction; a source of steam selectively connectable to supply steam to the biomass in the extraction vessel; a separator for separating the steam that has contacted the biomass in the extraction vessel and solvent entrained therewith; and a delivery line for steam/solvent selectively interconnectable between the extraction vessel and the separator to permit passage of steam and solvent entrained therewith to the separator.

In use of the apparatus steam advantageously strips solvent (that typically is an HFC such as 1,1,1,2-tetrafluoroethane, or mixtures of HFC's) from the biomass. The solvent is then entrained in the steam and conveyed to the separator, where the steam and the solvent are separated to allow recovery and/or disposal of the solvent.

In use of the apparatus the steam may contact the biomass once; or the apparatus may optionally include means such as pipework and valves permitting the steam to contact the biomass more than once.

Preferably the source of steam supplies steam at or near atmospheric pressure.

Alternatively the source of steam supplies steam at superatmospheric pressure.

In preferred embodiments the separator is or includes an adsorbent material for removing solvent entrained with the steam. More preferably the adsorbent material is or includes activated carbon. These features conveniently make the solvent available for recycling, or permit ready disposal of the solvent.

The adsorbent filter material may also act to reduce any volatilised organic materials present in the depleted biomass, again improving the quality of the effluent condensate. Depending on the nature of the adsorbent and on economic attractiveness, a concentrated stream of recovered HFC may be obtained from thermal regeneration of the adsorbent. Alternatively, the loaded adsorbent provides a convenient, compact and cost-effective package for appropriate disposal.

Optional forms of apparatus of the invention include a condenser, either upstream or downstream of the separator, to condense the stream and facilitate separation of the steam and solvent from one another.

A preferred form of extraction vessel includes a cylindrical chamber closed at either end and having an inlet at one end and an outlet at its other end, the hollow interior of the chamber being for containing biomass, the inlet being selectively connectable to a source of solvent and a source of steam; and the outlet being selectively connectable as part of a circuit for recovering biomass extract to a vacuum or to the separator. The purpose of the option connection to a vacuum or to suction is to permit evacuation of the vessel at the end of a biomass extraction, thereby removing from the vessel the bulk of the solvent therein. This means that the steam serves primarily to strip solvent that is adsorbed onto the surface of the biomass.

The vacuum connection may also advantageously be used to purge the vessel of e.g. water, when it is required to extract a new bed of biomass.

Preferably the extraction vessel is in use vertical, with the inlet at its lower end and the outlet at its upper end. This advantageously allows th charging of the extraction vessel with a packed bed of biomass. Such a packed bed may advantageously occupy substantially the entire cross-section of part of the vessel.

This arrangement has advantages in reducing the energy consumption of biomass extraction apparatus as shown in FIG. 1.

The extraction vessel may optionally include a selectively operable condenser (cooling) jacket. This allows steam condensing advantageously to occur within the extraction vessel.

Preferably the extraction vessel includes thermal insulation. This advantageously reduces heat transfer from the vessel during both the biomass extraction and desorption (solvent recovery) processes.

According to a second aspect of the invention there is provided a method of removing solvent residues from a bed of biomass, comprising contacting the biomass with steam; passing the steam and solvent entrained therewith to a separator; and separating the steam and the solvent from one another in the separator. This method may conveniently be practised using apparatus as defined herein.

Further, advantageous features of the method are that the step of separating includes contacting an adsorbent with the steam/solvent mixture; the step of condensing the steam before or after passing it to the separator; the step of condensing the steam before passing it to the separator; and wherein the condensing occurs within a vessel containing the biomass; the step of contacting the biomass with steam occurs in a vessel, and the method includes the step of partially or substantially evacuating the vessel before the steam contacts the biomass; the step of separating includes contacting an adsorbent with the steam/solvent mixture; and including the step of heating the adsorbent to recover solvent therefrom; the step of separating includes contacting an adsorbent with the steam/solvent mixture; and including the step of disposing of the adsorbent and the solvent therewith; and/or the step of condensing the steam includes recovering heat from the condensate and using the recovered heat to pre-heat water for steam generation.

The method of the invention is superior to simple heating and/or evacuation, because the temperature of the biomass is raised rapidly and directly through intimate contact with steam steam flow acts to maintain a low partial pressure of HFC solvent in the vapour space around the biomass thus aiding transfer of HFC from the biomass to the steam stream water from the steam is likely to act to displace HFC from the surface of the biomass through preferential adsorption thus further improving the rate and effectiveness of desorption relative to a flow of other gases such as nitrogen.

Figure 2:
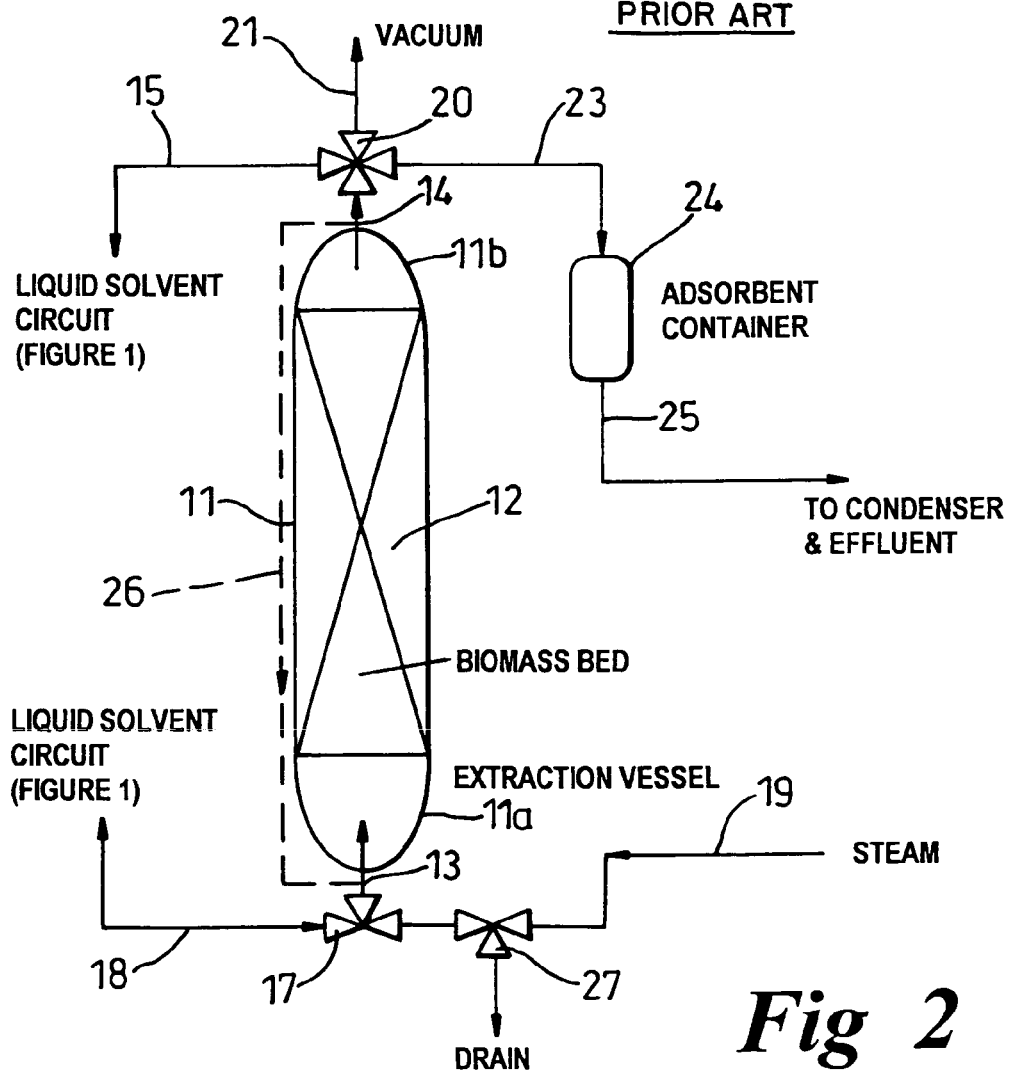

There now follows a description of a preferred embodiment of the invention, by way of non-limiting example, with reference being made to the accompanying drawings in which:

FIG. 1 is a schematic representation of a prior art closed loop biomass extraction circuit; and FIG. 2 is a schematic representation of apparatus according to the invention, that may be included in the FIG. 1 circuit.

Referring to FIG. 2 there is shown a part of the FIG. 1 circuit, modified in accordance with the invention. The remainder of the circuit part-illustrated in FIG. 2 is as shown in FIG. 1.

FIG. 2 shows the extraction vessel 11 of the FIG. 1 apparatus, in the form of a hollow cylinder, closed at each end 11a,11b and being in the preferred embodiment of flanged tube construction. In the preferred embodiment vessel 11 is vertical as shown, although other orientations, e.g. inclined or horizontal, are possible. A packed bed 12 of biomass is in use of the apparatus supported within extraction vessel 11, the cross-section of the packed bed 12 being substantially the same as that of the entire cross-section of the vessel 11 over a substantial part of its length.

The vessel 11 is used for biomass extraction, during which solvent such as an HFC is fed into the bottom 11a of vessel 11 via an inlet 13. The solvent passes upwards through the biomass, contacting it and entraining biomass extract. The solvent and extract mixture is conveyed via outlet 14 and delivery line 15 to the remainder of the extraction circuit of FIG. 1. In other words, the solvent/extract liquor passes via line 15 to the evaporator 12 of FIG. 1.

A source of steam (e.g. a factory steam supply or a steam generator) is also connectable to inlet 13 from a line 19. This is achieved, e.g. by means of a flow control valve 17 to which both the solvent line 18 and steam line 19 are connected. The flow control valve is operable e.g. under computer control to direct either the solvent from line 18 or the steam in line 19 via the inlet 13.

Thus the steam line 19 is connectable to supply steam, at atmospheric or superatmospheric pressure, to the biomass in vessel 11.

Steam line 19 includes an optional drain valve 27 for draining fluid from line 19.

A flow control valve 20 is operable e.g. under computer control to connect the outlet 14 to the solvent/extract delivery line 15; to suction or a vacuum (e.g. generated by a vacuum pump) 21 (for purposes described hereinbelow); or to a further steam line 23 for delivering steam, that has contacted the biomass, and solvent entrained therewith, to a separator in the form of a hollow container 24, in fluid communication with line 23 and containing an adsorbent material such as activated carbon.

When valve 20 is controlled to connect outlet 14 to steam line 23, steam and solvent pass to container 24 where the adsorbent material separates the steam and solvent from one another.

As shown in FIG. 2 the container 24 includes an outlet 25 remote from line 23, by means of which steam may pass to a condenser (not shown) and thence, in liquid form, to an effluent drain or reservoir.

In an alternative arrangement, not forming cart of the invention, the condenser may be operatively connected in line 23, upstream of container 24, to permit condensation of the steam before removal of the solvent therefrom by means of the adsorbent material.

Other optional features of the apparatus, that may improve energy utilisation in use, include but are not limited to:

heat recovery from the condensate into the steam generator feed water use of a jacket around the extraction vessel as the steam condenser to mininise condensation within the extraction vessel during desorption use of an insulated extraction vessel to maintain the internal temperature of the vessel during both extraction and desorption stages The apparatus may also optionally include a switchable recirculation loop for the steam, whereby the steam may be caused to contact the biomass more than once. The recirculation loop may be constituted by the line 26 shown dotted in FIG. 2. The flow of steam via line 26 may be determined by e.g. computer controlled valves connecting line 26 to inlet 13 and outlet 14 at either end. The extent of use of a given quantity of steam would be determined by the extent to which it becomes saturated with the solvent.

In use of the apparatus of FIG. 2. following completion of biomass extraction, valve 17 is closed so that neither solvent (from line 18) nor steam (from line 19) enters vessel 11.

Outlet 14 is then connected, through operation of valve 20, to vacuum 20. The bulk of liquid solvent in vessel 11 is consequently sucked out of vessel 11 by vacuum 20, until the solvent remaining in vessel 11 is constituted substantially by solvent adsorbed onto the biomass.

At this point valve 20 operates to connect outlet 14 to line 23, and valve 17 operates to connect inlet 13 to steam line 19. Steam then flows into vessel 11 and contacts the biomass, thereby removing solvent from the biomass and conveying it via line 23 to the separator constituted by container 24 and the adsorbent material therein.

If line 26 is present, some or all of the steam may be recycled one or more times, using control of the various valves in the apparatus, so that the steam contacts the biomass more than once.

After passing through the adsorbent material in container 24 the steam passes via line 25 for condensing and draining.

If the condenser is in line 23 upstream of container 24, the steam is of course in liquid form by the time it contacts the adsorbent material. In this case there may be no need for subsequent condensing.

After desorption of solvent from the biomass is complete, the biomass is discharged from the extraction vessel and the vessel recharged with fresh biomass and evacuated using vacuum 21 prior to introduction of fresh solvent from the extraction solvent circuit.

Following completion of the desorption process the adsorbent material may if desired be removed from the container 24 and heated to recover solvent therefrom.

Alternatively the adsorbent material including adsorbed solvent may be disposed of in e.g. a landfill site or by incineration.

If the apparatus includes a steam generator, heat from the steam condenser may conveniently be used as a pre-heat for water in the steam generator.

What is claimed is:

1. Apparatus for removing solvent residue from a bed of biomass, comprising:

an extraction vessel for containing biomass, that permits a solvent or a solvent mixture to contact biomass therein to effect extraction;

a source of steam, selectively connectable to supply steam to biomass in the extraction vessel;

a separator for separating steam, that has contacted biomass in the extraction vessel, and solvent entrained therewith;

a delivery line for steam/solvent selectively interconnectable between the extraction vessel and the separator to permit passage of steam and solvent entrained therewith to the separator; and the separator including an outlet, the outlet being operatively connected to a condenser to condense the steam after removal of the solvent therefrom by means of the separator.

2. Apparatus according to claim 1 wherein the source of steam supplies steam at atmospheric pressure.

3. Apparatus according to claim 1 wherein the source of steam supplies steam at super-atmospheric pressure.

4. Apparatus according to claim 1 wherein the separator is or includes an adsorbent material for removing solvent entrained with the steam.

5. Apparatus according to claim 1 wherein the separator is or includes an adsorbent material for removing solvent entrained with the steam; and wherein the adsorbent material is or includes activated carbon.

6. Apparatus according to claim 1 wherein the separator is or includes an adsorbent material for removing solvent entrained with the steam; and wherein the separator includes an inlet for receiving steam and solvent from the extraction vessel.

7. Apparatus according to claim 1 wherein the extraction vessel is a cylindrical chamber closed at either end and having an inlet at one end and an outlet at its other end, the hollow interior of the chamber being for containing biomass, the inlet being selectively connectable to a source of solvent and a source of steam; and the outlet being selectively connectable as part of a circuit for recovering biomass extract; to a vacuum; or to the said separator.

8. Apparatus according to claim 1 wherein the extraction vessel is a cylindrical chamber closed at either end and having an inlet at one end and an outlet at its other end, the hollow interior of the chamber being for containing biomass, the inlet being selectively connectable to a source of solvent and a source of steam; and the outlet being selectively connectable as part of a circuit for recovering biomass extract; to a vacuum; or to the said separator; and wherein the extraction vessel is in use vertical, with the inlet at its lower end and the outlet at its upper end.

9. Apparatus according to claim 1 wherein the extraction vessel contains a packed bed of biomass.

10. Apparatus according to claim 1 wherein the extraction vessel contains a packed bed of biomass; and wherein the packed bed of biomass occupies substantially the entire cross-section of at least a portion of the extraction vessel.

11. Apparatus according to claim 1 including a steam condenser jacket around at least part of the extraction vessel.

12. Apparatus according to claim 1 including thermal insulation for the extraction vessel.

* * * * *